United States Patent [19]

Lyman

[11] Patent Number: 5,793,603
[45] Date of Patent: Aug. 11, 1998

[54] ULTRACAPACITOR DESIGN HAVING A HONEY COMB STRUCTURE

[75] Inventor: Philip C. Lyman, Boulder, Colo.

[73] Assignee: Boundless Corp., Boulder, Colo.

[21] Appl. No.: 752,312

[22] Filed: Nov. 19, 1996

[51] Int. Cl.[6] ............................................ H01G 9/00
[52] U.S. Cl. .................... 361/503; 361/504; 361/512; 361/520
[58] Field of Search ...................... 361/500, 502, 361/503, 504, 508, 511, 512, 516, 513, 520, 522, 523, 524, 525, 528, 530, 532, 273; 29/25.03; 429/152

[56] References Cited

U.S. PATENT DOCUMENTS

| | | | |
|---|---|---|---|
| 3,278,816 | 10/1966 | Gaenge et al. | 361/273 |
| 5,121,301 | 6/1992 | Kurabayashi et al. | 361/502 |
| 5,142,451 | 8/1992 | Kurabayashi et al. | 361/502 |
| 5,150,283 | 9/1992 | Yoshida et al. | 361/502 |
| 5,567,544 | 10/1996 | Lyman | 429/152 |
| 5,568,353 | 10/1996 | Bai et al. | 361/523 |

OTHER PUBLICATIONS

"Surging ahead with Ultracapacitors," Steven Ashley, *Mechanical Engineering*, 76–79 (1995).
"The Aerocapacitor: An Electrochemical Double–Layer Energy–Storage Device," Mayer, Pekala, Kaschmitter, *Soc. Electrochem. Society, Inc.*, 140(2): 446–451 (1993).

*Primary Examiner*—Kristine L. Kincaid
*Assistant Examiner*—Anthony Dinkins
*Attorney, Agent, or Firm*—Scott B. Allison; Robert G. Crouch; Chrisman Bynum & Johnson

[57] ABSTRACT

A capacitor assembled in the form of a lightweight structural panel and including isolated capacitor cells. Each of the cells includes a honeycomb structure wherein each film-like layer in the honeycomb structure is an electrode stack. Each of the electrode stacks includes an elongated cathode, an elongated separator, and an elongated anode. The separator is wetted with an electrolyte solution to enhance the dielectric properties of the separator. Alternatively, the capacitor cell could be composed of a foam-like cathode, foam-like separator, and a foam-like anode. With either embodiment, the invention achieves the storage of electrostatic energy in a structure with a multitude of voids defined therein so that the structure is relatively stiff, yet light weight.

27 Claims, 7 Drawing Sheets

ULTRACAPACITOR DESIGN HAVING A HONEY COMB STRUCTURE

The present invention relates to an improved design for an ultracapacitor, and more particularly, to a distributed ultracapacitor design in which the functional components of the ultracapacitor serve as structural members for the vehicle or device using the ultracapacitor.

BACKGROUND OF THE INVENTION

The gasoline- or diesel-powered motor vehicle with an internal combustion engine is the standard mode of conveyance for the majority of adults in civilized countries. Unfortunately, such motor vehicles with engines operating on gasoline or other hydrocarbon fuels have two significant disadvantages. First of all, the exhaust emissions from such vehicles is a significant contributor to the air pollution problem in urban areas. Second, most countries do not have sufficient natural resources to produce hydrocarbon fuels (particularly gasoline) at or near market prices. Accordingly, these countries are dependent upon other countries for these resources.

For these and other reasons, momentum is building to develop motor vehicles with alternative sources of power. Among the leading candidates are electric vehicles which are powered by electrochemical batteries. In the United States, at both the state and federal levels, there are current laws and pending legislation relating to: the sale of new electric vehicles; tax credits for purchasers of electric vehicles; and requirements on the percentage of emission-free vehicles which must be sold relative to vehicles which do exhaust emissions. In 1990, the Federal Government authorized the establishment of the U.S. Advanced Battery Consortium (USABC). Under the aegis of the Department of Energy, USABC brings together Chrysler, Ford, General Motors, and the Electric Power Research Institute to sponsor research and development of batteries for electric vehicles. The USABC has identified a number of parameters, or goals, for an electric vehicle battery system. One of the parameters is peak power, which is typically relatively low for battery systems.

Another alternative form of motor vehicles is the hybrid-electric vehicle. Such vehicles use a fuel cell or else a combustion engine to drive an electric generator to produce electric power for a motor which drives the wheels. The combustion engine or fuel cell produces a relatively constant supply of power for the steady state power requirements for the vehicle. In other words, it powers the vehicle during constant speed while driving on level terrain. For vehicle acceleration and hill climbing, an additional surge of peak power is required. These vehicles typically use a large capacitor to satisfy the peak power demand. The capacitor recaptures electrical energy during braking of the vehicle. This is done by switching the motor normally used to drive the vehicle into an electrical generator during braking of the vehicle. The back-electromotive force slows the vehicle and generates electricity to recharge the capacitor.

Capacitors are electrical devices which store electrical energy in the form of electrostatic charge on pairs of opposed plates or electrodes. Thus, since capacitors have no moving parts and do not require electrochemical reactions involving the introduction of reagents and removal of reaction by-products, they are relatively simple devices. Most importantly, capacitors can be charged and discharged relatively quickly and thus can accommodate short power surges and can be recharged quickly during times when excess power is available.

There are two primary advantages of hybrid-electric vehicles using very large capacitors to accommodate surge power demands and recapture electrical energy during braking. First, the average power source (combustion engine or power source) may be smaller than if it were sized to accommodate peak power demand. Accordingly, it may be lighter and less expensive. Second, the electrical power source for the average power demand may be optimized for a single operating speed or power. In the case of generators driven by a combustion engine, the combustion engine may be operated at a much higher efficiency than is typical of today's combustion-only vehicles which are without an electric component in the drive-train. Fuel efficiencies three times greater than for combustion-only vehicles are predicted for hybrid-electric vehicles. In the case of the fuel cell, its reactant flow-rates, catalyst, membrane, and electrical current collector designs may all be optimized for peak efficiency at a single operating point.

Other applications where brief surges of high peak power are required are high-power lasers and rail-gun projectile accelerators. In these and the previously-mentioned applications, the extremely large capacitors are referred to as ultracapacitors, which include capacitors having energy storage capabilities greater than one to two Watt-hours per kilogram (W-hr/kg). The highest energy efficiency in currently commercially-available ultracapacitors comes from Panasonic and is rated at 2.3 W-hr/kg. While some research applications may show promise of ultracapacitors with storage capabilities of 8 W-hr/kg, alternative vehicle designers are seeking ones with 15 W-hr/kg. Thus, today's ultracapacitors are typically massive in weight and volume to provide the required energy.

Recently, research and development work in the field of ultracapacitors has resulted in the development of porous electrode materials. These include very highly-porous carbon material serving as electrodes to effectively provide very large surface areas for the electrodes. In addition, the increased surface area comes without an accompanying gain in weight. Thus, ultracapacitors with porous electrode materials have improved energy densities.

The highly porous electrode materials are applicable to electrolytic capacitors. An electrolytic capacitor uses a continuous medium, usually a fluid, to carry ions between the opposed electrodes of the capacitor. The electrolyte can effectively shrink the separation distance between the plates to molecular distances. This occurs when the electrolyte material effectively coats the entire porous surface with material that includes ions or molecules with electrical charge polarity. Upon charge and discharge of the capacitor, the ions in the electrolyte material reorient to either cancel or enhance the charge on the surface of the electrode. In this manner, the capacitance is increased above that of a purely electrostatic (no electrolyte) device. Thus, when used in conjunction with porous electrodes, which have inherently high surface areas, the capacitor can more effectively utilize its increased surface area.

Even in such chemically-enhanced devices, there is still no net transport of material between electrodes, just reorientation in-situ. Hence, these ultracapacitors maintain much higher cycle life than rechargeable chemical batteries in which extraction and redeposition in the electrodes causes degradation and shorter cycle life. Despite research in both electrode porosity and electrolytic techniques to enhance capacitance, significant further improvement is required in energy densities for ultracapacitors before they will be practical for use in motor vehicles.

Because of the relatively low energy density in capacitors, the capacitor must have a large mass and volume. Thus, the capacitor system for a motor vehicle may be extremely large in volume and mass, perhaps occupying a significant amount of the engine and trunk compartments of a standard passenger automobile. Typically, the capacitor not only has a large volume and mass but is concentrated into one or two particular areas in the vehicle. Such a design can be dangerous in an automobile crash in which the concentrated, large capacitor may come through the trunk of the vehicle and crush the occupants and contents in the passenger compartment of the vehicle. Further, capacitors are typically placed in an outer shell or container which adds nothing to the operation or function of the capacitor or of the vehicle or device associated with the capacitor. As capacitor systems become very large for electric vehicles, the mass of this container becomes substantial.

In addition to the deficiencies in mass and volume energy density, the highly porous nature of the electrode materials means that the electrodes themselves have a relatively higher impedance. This is because it is relatively more difficult to flow current in and out of highly porous materials. Unfortunately, this increase in internal impedance serves to negate the gains in capacitance resulting from the use of the porous materials, since more energy is lost in the form of heat during charge and discharge due to the increased internal impedance.

Lastly, due to the very nature of the highly porous materials and the optimization of their capacitance characteristics, these materials are difficult and expensive to manufacture. It is against all of this background and the desire to solve the problems of the prior art, that the present invention has been developed.

SUMMARY OF THE INVENTION

Accordingly, it is an object of the present invention to provide an ultracapacitor which has or effectively has an increased energy density.

It is also an object of the present invention to provide a large capacitor with an increased amount of current collecting material so as to reduce internal impedance and increase capacitor efficiency.

It is further an object of the present invention to allow the use of less-highly optimized capacitive materials, which are easier to manufacture, and thus are less expensive.

It is still further an object of the present invention to provide a distributed design for placing a capacitor in an electric or hybrid-electric vehicle.

Additional objects, advantages and novel features of this invention shall be set forth in part in the description that follows, and in part will become apparent to those skilled in the art upon examination of the following specification or may be learned by the practice of the invention. The objects and advantages of the invention may be realized and attained by means of the instrumentalities, combinations, and methods particularly pointed out in the appended claims.

To achieve the foregoing and other objects and in accordance with the purposes of the present invention, as embodied and broadly described therein, the present invention is directed to a capacitor for storing electrical energy having an elongated anode including an electrode layer, an elongated cathode positioned adjacent and in spaced-apart relation to the a node, the cathode also including an electrode layer, and a separator positioned between the anode and the cathode which serves as a dielectric by providing electrical insulation between the anode and the cathode yet permitting an electrostatic field to be developed between the anode and the cathode to increase the energy storable in the capacitor. The anode, the separator, and the cathode form an elongated capacitor stack and a plurality of elongated capacitor stacks are connected together in a honeycomb structure.

The separator may be permeable and wetted with an electrolyte solution which enhances the dielectric properties of the separator. Both the anode and cathode may include a support layer as well as the electrode layer. Both the anode and cathode may include a current collector layer as well as the electrode layer. Both the anode and cathode may include a support layer and a current collector layer, as well as the electrode layer. The anode and cathode may be bonded to the separator. The separator may include a polymeric material which separates and bonds the anode and cathode. The electrolyte solution may include potassium-hydroxide. The electrolyte solution may include an organic solvent with dissolved ions. The honeycomb structure may be formed by bonding at a series of regular, spaced-apart positions between each pair of adjacent capacitor stacks. The positions of the bonds between any pair of adjacent capacitor stacks may be offset from the positions of the bonds between one of the pair of adjacent capacitor stacks and the oppositely-adjacent capacitor stack. A plurality of separate honeycomb structures may be each combined as separate cells into a capacitor panel which includes an insert frame which receives each of the plurality of separate cells and also includes a pair of faceplates, an upper faceplate and a lower faceplate, which are attached to the insert frame from opposite sides to sandwich the cells therein. The faceplates may be bonded to the insert frame and to the separate cells, the bonding of the faceplates to the insert frame and to the separate cells being made by electrically-insulating adhesive. The capacitor may include a plurality of edge closures peripherally outside of the insert frame and the separate cells and also sandwiched between the faceplates.

Further, the direction of energy flow to the capacitor may be reversible so that energy can be stored in the capacitor by charging the capacitor and the energy can be extracted from the capacitor by discharging the capacitor. On the anode a thin film of polypropylene may serve as the support layer and a thin film of nickel may be sputtered onto the polypropylene to form the current collector layer. On the cathode a thin film of polypropylene may serve as the support layer and a thin film of nickel may be sputtered onto the polypropylene to form the current collector layer. The separator may be a polypropylene cloth onto which nickel is sputtered in a thin film and then particulate nickel is deposited thereon. The capacitor may also include a second separator and second cathode positioned adjacent to the anode and on an opposite side of the anode from the first separator and first cathode.

The present invention is also directed to a method for assembling a capacitor, including the steps of providing an elongated anode including an electrode, providing an elongated cathode including an electrode, providing an elongated, porous separator, bonding the anode and cathode to opposite sides of the separator to form an elongated capacitor stack, assembling a plurality of elongated capacitor stacks into a honeycomb structure, and wetting the separator with an electrolyte.

Further, the honeycomb structure may define a capacitor cell, and the method may further include the steps of isolating a plurality of the capacitor cells from each other, encasing the plurality of isolated capacitor cells within a shell to form a capacitor panel, and providing electrical feed-throughs from the capacitor cells to the exterior of the shell.

The present invention is also directed to a capacitor for storing electrical energy, including an anode having an electrode, the electrode having a multitude of voids defined therein, a cathode positioned adjacent and in spaced-apart relation to the anode, the cathode having a multitude of voids defined therein, the cathode having an electrode, and a separator positioned between the anode and the cathode which serves as a dielectric by providing electrical insulation between the anode and the cathode yet permitting an electrostatic field to be developed between the anode and the cathode, to increase the energy storable in the capacitor, the separator having a multitude of voids defined therein. The anode, the separator, and the cathode form a structure which has a multitude of voids defined therein to provide a sturdy yet light-weight structure. Further, the anode and the cathode may be composed of a foam material.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

In the Drawings.

DETAILED DESCRIPTION OF THE PREFERRED EMBODIMENTS

The present invention relates to capacitor systems including capacitor panels composed of one or more capacitor cells. The cells may be electrically connected to each other in series or in parallel to provide the desired electrical characteristics. Each cell includes a plurality of elongated, electrode stacks formed in a honeycomb structure.

Figure 1:
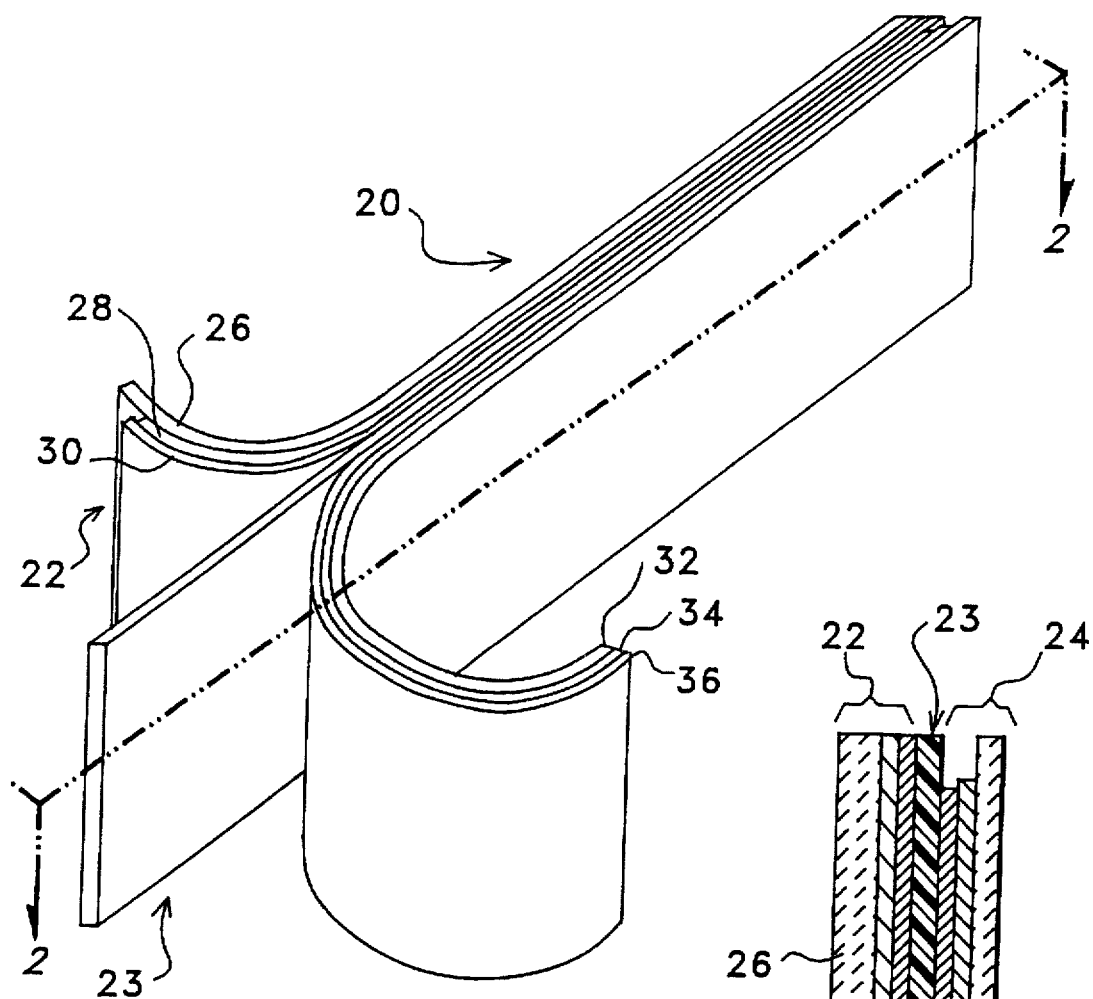
FIG. 1 is an perspective view of an electrode stack of the present invention, showing various layers of the electrode stack in peeled-away positions.
Figure 2:
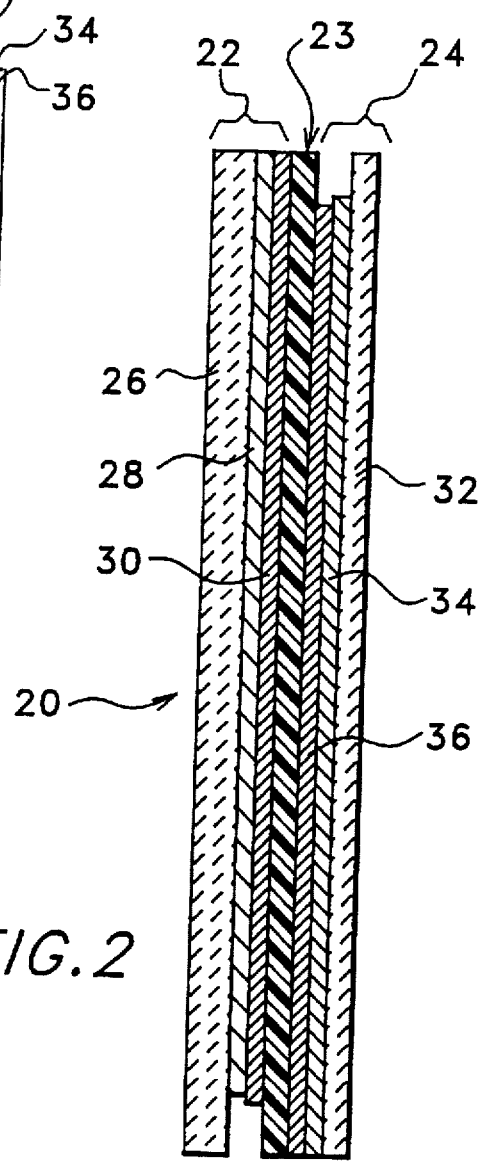
FIG. 2 is cross-sectional view taken along line 2—2 of FIG. 1.

A thin, elongated, ribbon-shaped electrode stack 20 of the present invention is shown in FIGS. 1 and 2. The electrode stack 20 is multi-layered and includes an elongated negative electrode, or cathode 22, an elongated separator 23, and an elongated positive electrode, or anode 24. The cathode 22 preferably has three layers, including a supporting substrate layer 26, a cathode current collector layer 28, and a porous electrode layer 30. The anode 24 is made up of three similar layers beginning with a supporting substrate layer 32, an anode current collector layer 34, and ending with an electrode layer of highly porous material 36. The supporting substrate layers 26 and 32 are composed of solid propylene film, while the current collector layers 28 and 34 are composed of nickel (Ni) foil or other conductive metal which resists attack by electrolytes. Alternatively, the substrate layers 26 and 32 and the current collector layers 28 and 34 could be composed of graphite fibers or ceramic fibers coated with metal.

Figure 13:
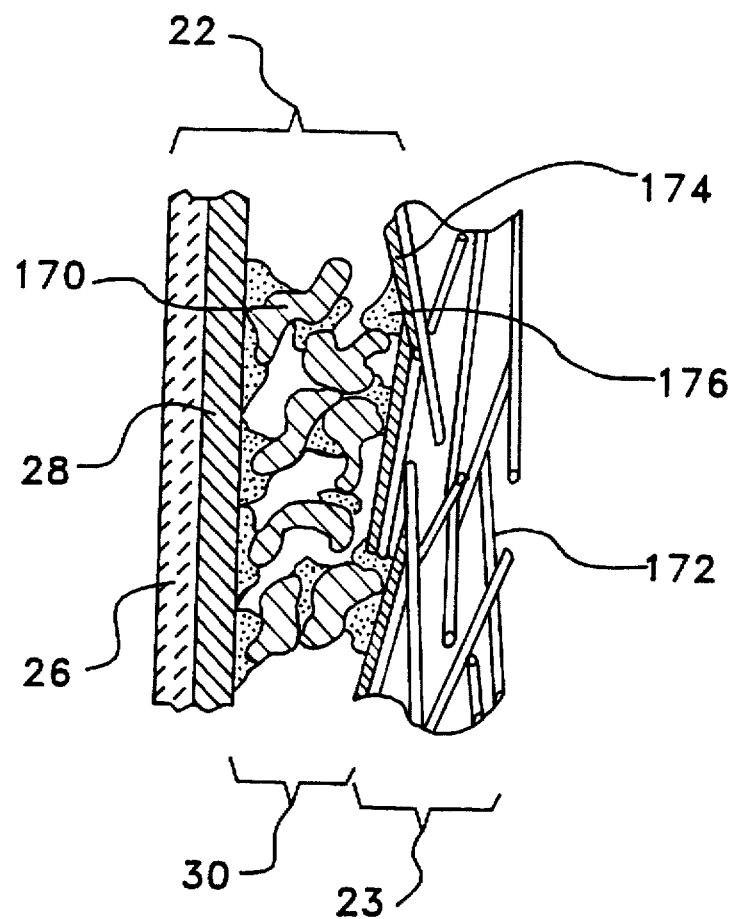
FIG. 13 is a close-up view shown at a microscopic level of the mechanical interface between the cathode and separator of the electrode stack of FIG. 2.

The electrode layers 30 and 36 are composed of a highly porous electrode material such as aerogel carbon, particulate activated carbon, Ni—NO or $RuO_2$ particles, which are bonded through electrodeposition to the current collectors 28 and 34 and to the separator 23 to continuously adhere the entire electrode stack 20 together. FIG. 13 shows a view, at a microscopic level, of the mechanical interface between the electrode layer 30 of the cathode 22 and the separator 23. As can be seen, the electrode layer 30 is composed of individual particles 170, just as the separator 23 is composed of individual fibers 172. The separator 23 also has a coating of nickel 174 which has been sputtered thereon. By electrodeposition, nickel fill material 176 is applied which binds the particles 170 in the electrode layer 30 to the nickel coating 174 of the separator 23. In addition, the nickel fill material 176 binds the particles 170 to each other and to the current collector layer 28. In this manner, the separator 23 is bound to the current collect layers 28 and 34 and the electrode layers 30 and 36 of the cathode 22 and anode 24, respectively.

The porous material of the electrode layers 30 and 36 serves to increase the effective surface area of the current collector layers 28 and 34 per unit of weight. Also, the oxide materials provide pseudo-capacitance, i.e. faradic oxidation and reduction of the electrode interface or deposition and removal of a one-atom thick layer of atoms on the electrode surface. These effects enhance capacitance because they are voltage-potential-dependent and highly reversible.

As described above, the cathode 22 and anode 24 are bonded to opposite sides of the elongated separator 23. The separator 23 has the dielectric qualities of electrically insulating the cathode 22 from the anode 24 by resisting electrical conduction even when exposed to a voltage differential between the cathode 22 and anode 24, while at the same time allowing the passage of ions therebetween via a liquid electrolyte solution (not shown), an aqueous or organic solvent with dissolved ions, both positive and negative, (such as a three molar solution of Potassium Hydroxide in water) which has been wicked into the separator 23. Alternatively, the electrolyte solution could be any organic or inorganic electrolyte, such as polypropylene carbonate, or any other solution which has the characteristics described above.

The dielectric qualities of the separator plus electrolyte serve to enhance the capacitance of the electrode stack and, accordingly, increase the energy which is storable therein. Also, the separator 23 serves to retain the electrolyte solution, usually by being porous and absorptive. In this case, the separator may simply space apart the electrodes so as retain the electrolyte solution via capillary action. Preferably, the separator 23 is composed of a polypropylene cloth. Depending on the electrolyte composition, the separator could be formed using fibers of cellulose, asbestos, or other materials not subject to decomposition in the electrolyte solution with the applied voltage. The separator 23 prevents direct contact between the cathode 22 and anode 24 which would short out the electrode stack 20. The separator 23 further maintains uniform spacing between the cathode 22 and anode 24 and provides containment of the electrolyte solution. Ions are permitted to drift during charge and discharge between the cathode 22 and anode 24. Theoretically, the separator could be infinitesimally thin. This would decrease the mass of the separator and the electrolyte retained therewithin. Practically, however, it is difficult to accommodate a separator too thin, especially since the two electrodes must not be allowed to contact each other. For this reason, the separator used preferably will be in the approximate range of 5 microns to 2 mils.

Alternatively, the separator plus liquid electrolyte could be replaced with a solid-state electrolyte such as a polymeric material which provides electrical insulation and ion transport while retaining the physical and structural characteristics of a solid.

As viewed in cross-section in FIG. 2, it can be seen that the cathode 22 and anode 24 are mounted to the separator 23 in a manner so that they are slightly offset from each other. This allows for external electrical connection to the cathode 22 and anode 24 via the opposite ends of the stack 20. This technique reduces the likelihood of electrical shorting between the cathode 22 and anode 24.

Preferably, the cathode 22, the separator 23, and the anode 24 all include material properties such that their combined tensile strength and modulus of elasticity allow them to serve as structural elements at higher levels of assembly as described subsequently.

Figure 3:
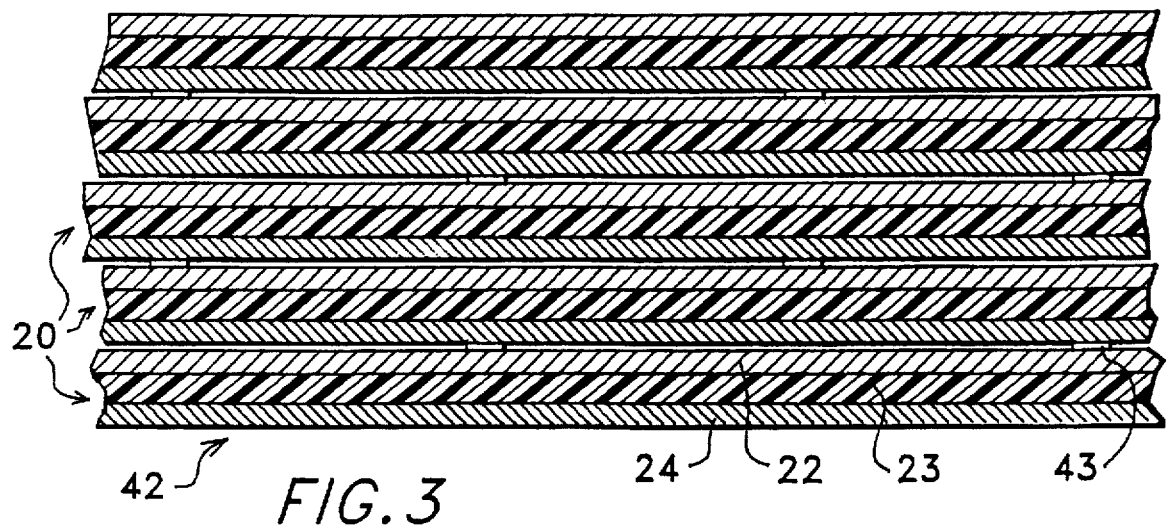
FIG. 3 is a cross-sectional view of a plurality of the electrode stacks of FIG. 1, the plurality of electrode stacks being arranged into a super-stack.
Figure 4:
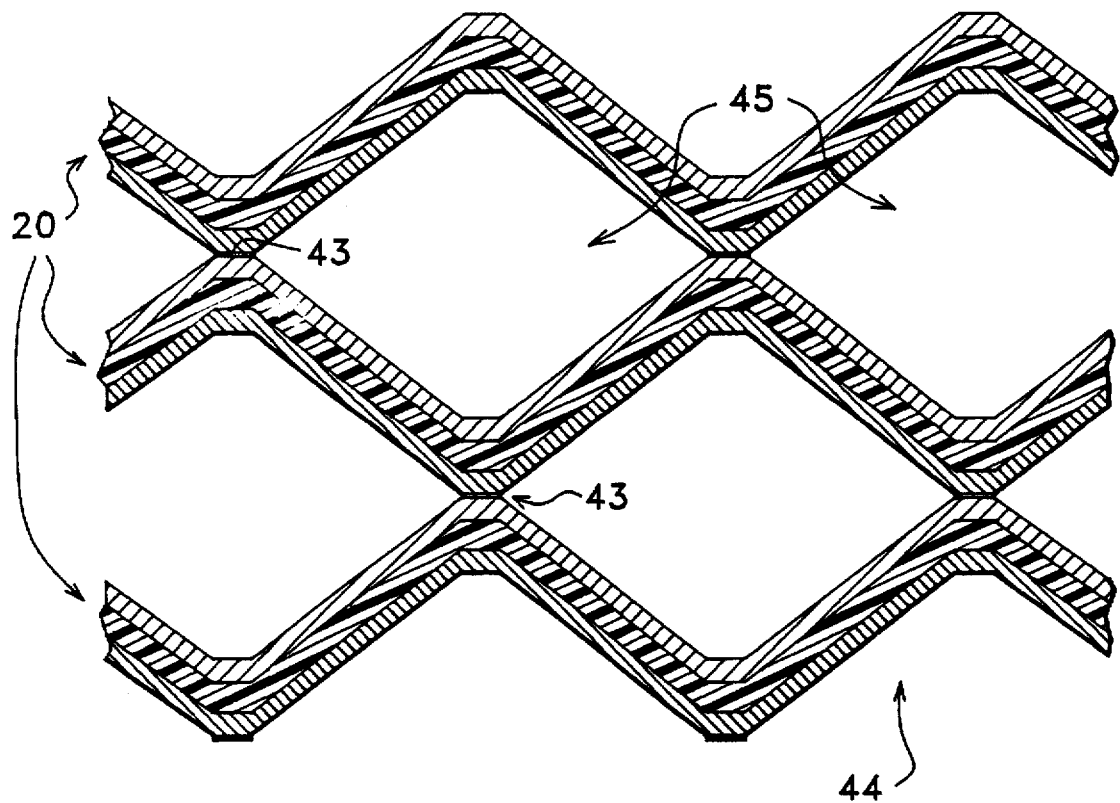
FIG. 4 is a cross-sectional view of the super-stack of FIG. 3 after the super-stack has been pulled into a honeycomb shape.

A plurality of electrode stacks 20 are adhered together into a super-stack 42 by adhesive 43, as shown in FIG. 3. The bond lines where the adhesive is applied extend across the entire height of the electrode stacks. The locations of the adhesive bond lines are staggered between alternating adjacent electrode stacks. As described in further detail below, this super-stack 42 can be pulled into a honeycomb structure 44, as shown in FIG. 4. The staggered bond lines cause a plurality of hexagon-shaped voids 45 to be defined between the adjacent electrode stacks 20 in the honeycomb structure 44. The voids 45 are generally empty but may be partially filled with the electrolyte solution. The adhesive 43 must be resistant to attack from the electrolyte solution. The voids have six sides. In FIG. 4, two of the sides are short relative to the other four sides, such that each void has more of a diamond-shaped appearance. The short sides are the adhesive bonded areas.

A desired number of electrode stacks 20 of a desired length can be combined together to form the aforesaid honeycomb structure 44 in a rectangular, box-shaped capacitor cell 46. The length of the capacitor cell 46 is determined by the length of the elongated electrode stacks 20 and the number and width of the adhesive bonds 43. The width of the cell 46 is determined by the thickness and number of the electrode stacks 20. The height of the cell 46 is determined by the height of the electrode stacks 20. This height will vary depending upon the application and even within the same application. For a motor vehicle, the height may be in the range of two inches or smaller or may be up to twelve inches or larger. For an electronics housing, it may be in the range of one-quarter of an inch or smaller.

Figure 5:
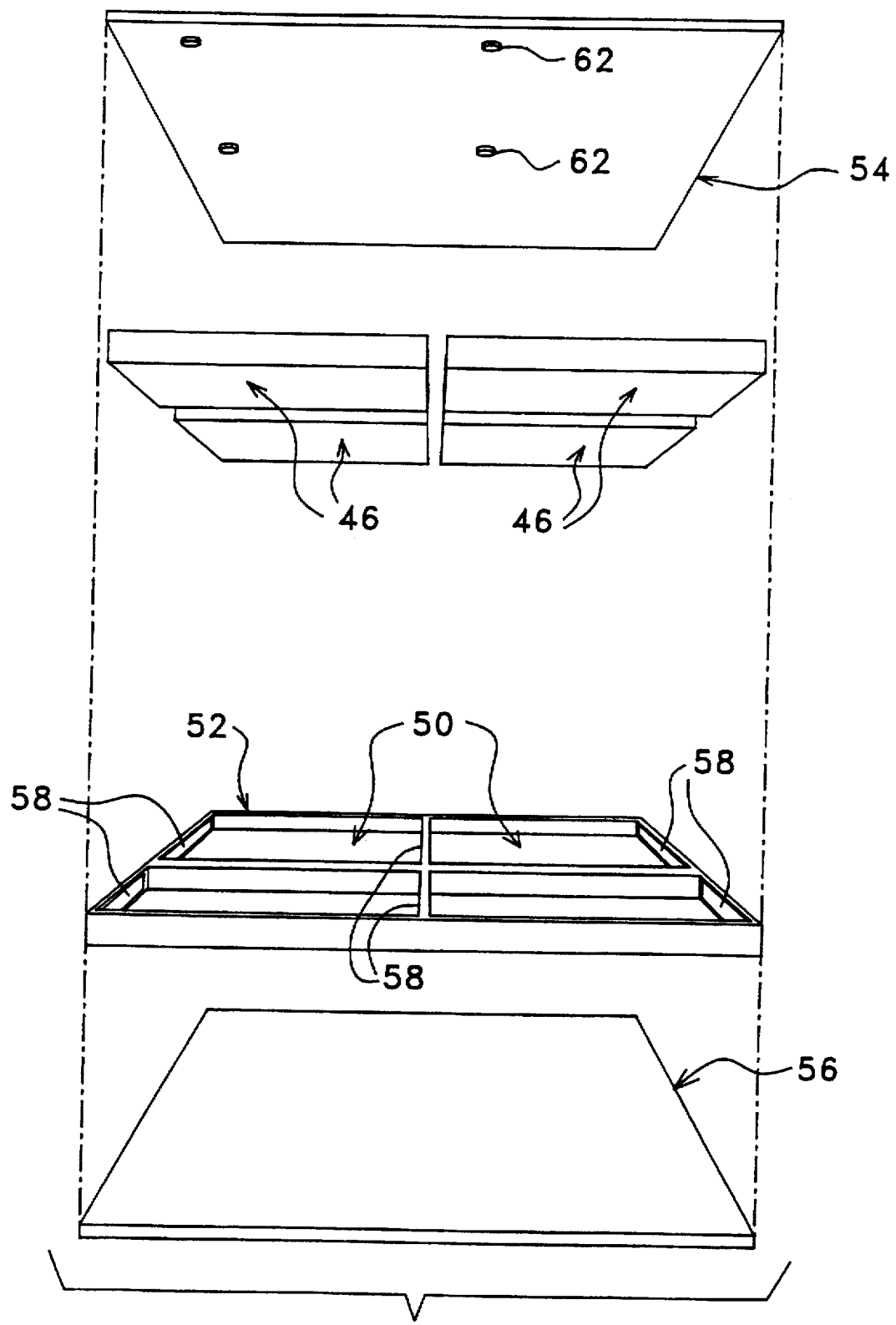
FIG. 5 is an exploded perspective view of a capacitor panel constructed in accordance with the present invention.

As shown in FIG. 5, a plurality of cells 46 can be contained in a capacitor panel 48. Each of the cells 46 fit within corresponding cut-outs 50 defined in an insert frame or layer 52 composed of an electrically-insulating material so as to isolate each of the cells 46 from each other. Preferably, the insulating material is fiberglass. Attached to the insert layer 52 on opposite sides thereof are an upper faceplate 54 and a lower faceplate 56, also composed of fiberglass and coated with polypropylene to prevent corrosive electrolyte from damaging the fiberglass. Facing inner surfaces of the insert layer 52 are coated with electrically conductive material making up core bulk current collectors 58 made of nickel which correspond to and are positioned adjacent to the ends of each electrode stack 20 in the capacitor cell 46. The facing inner surfaces of the insert layer 52 which are not provided with core bulk current collectors are coated with polypropylene to protect the fiberglass from the electrolyte. Because of the previously-described offset between the cathode 22 and anode 24 in the electrode stacks 20, one of each pair of core bulk current collectors 58 on the insert layer 52 makes electrical contact with the cathode 22 of each electrode stack 20 while the opposite facing one of the pair of core bulk current collectors 58 on the insert layer 52 makes electrical contact with the anode 24 of each electrode stack 20. In this manner, all of the electrode stacks 20 in the capacitor cell 46 are electrically connected together in parallel. The capacitor cells 46 and the insert layer 52 are sandwiched between the upper and lower panel faceplates 54 and 56, the inner surfaces of which are coated with face sheet adhesive. In this manner, the capacitor cells 46, the solid insert layer 52 and the faceplates 54 and 56 are bonded together to form a capacitor panel assembly 48. The overall strength and stiffness of the capacitor panel assembly 48 is governed by the dimensions and material properties of its various elements: the insert layer 52, the faceplates 54 and 56, the face sheet adhesive, and the capacitor cell 46 including its honeycomb core with its plurality of electrode stacks 20 (and their various layers), and the adhesive bond lines. The overall capacitance of the capacitor panel assembly 48 is governed by the numbers, materials and dimensions of the electrode stacks 20 and of the capacitor cells 46.

Figure 7:
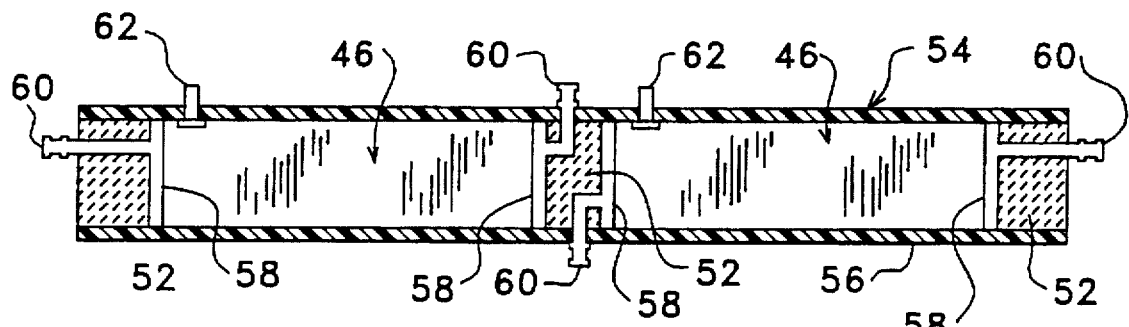
FIG. 7 is a cross-sectional view taken along line 6—6 of FIG. 5.

A path for electrical feed-through from each core bulk current collector 52 is provided by a pin 60 attached to each core bulk current collector 52, as shown in FIG. 7. In this way, the capacitor cells 46 can be connected together in parallel or series as desired. On the upper faceplate 54, an activation port 62 is provided through the faceplate 54. The activation port 62 allows for the addition and removal of the electrolyte solution from each cell 46.

Figure 8:
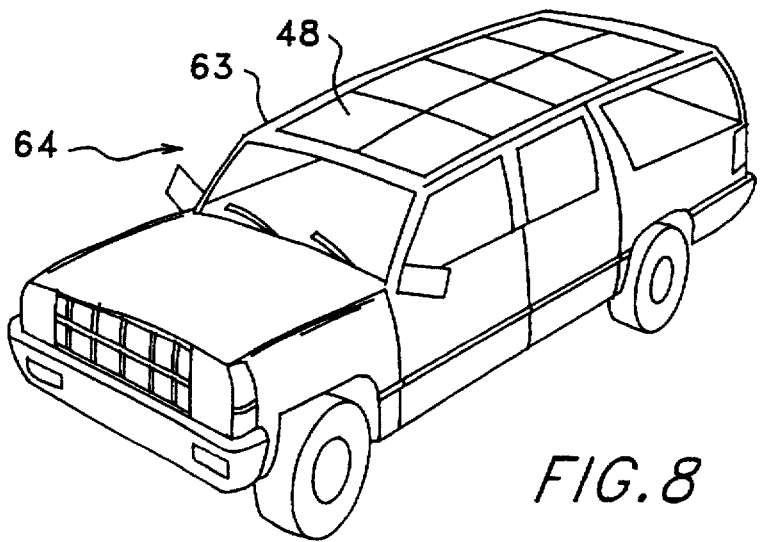
FIG. 8 is a perspective view of a passenger vehicle including a plurality of the capacitor panels of FIG. 7.

Once assembled, a plurality of capacitor panels 48 (FIG. 6) can be used as the body surface of a motor vehicle such as is shown on the roof 63 of a passenger vehicle 64 in FIG. 8. Of course, additional panels 48 could be used for the doors, fenders, hood, underbody, and within the engine compartments and other sections of the vehicle 64.

Assembly Process

The electrode stack 20 is assembled as follows. A fibrous, multi-ply polypropylene cloth with good inter-ply adhesion is cut into a ribbon shape. Masking is applied around the edges. A very thin layer of Ni is then sputtered onto the surfaces of the separator.

As a separate step, a thin film of polypropylene with perforations is also cut into two ribbon-shapes and sputtered with a thin layer of Ni to form the bulk current collectors.

Next, particulate Ni is deposited onto the sputtered surfaces of the separator. This layer would range from approximately 5 microns to 250 microns. The sprayed Ni particles retain a macroscopic porosity of greater than 80%.

The three layers: (1) sputtered polypropylene film; (2) masked, sputtered and Ni-particulate-coated separator; and (3) second piece of sputtered polypropylene film, are layered together and held together in a fixture.

The assembly is immersed in a Ni electrodeposition bath and additional Ni is slowly plated onto the assembly. In this manner, the Ni particles are bound to each other to form a "sintered" plaque. Ni deposits also bind the plaque to the bulk current collector and bind the plaque to the Ni sputtered fibers on the surface of the separator, as shown in FIG. 13.

In this manner, all seven layers of the electrode stack are laminarly bound to one another.

Electrical Aspects

Ultracapacitors with aqueous solutions of KOH can operate at a voltage of up to 1.2 volts; whereas ultracapacitors with organic electrolytes can operate in the range of 3 to 4 volts. The consequence of operating above the voltage limit, for either electrolyte, is decomposition of the ultracapacitor materials and failure to operate. The total voltage of the capacitor system can be provided in multiples of this voltage by providing capacitor cells 46 in series with each other. For example, placing ten such capacitor cells 46 in series would provide a voltage of 12 volts, using aqueous electrolyte.

The total capacitance and energy density is dependent on the amount of surface area in the cathodes 22 and anodes 24. It is also dependent on the chemical and dielectric properties of the surface materials on the cathodes 22 and anodes 24 and properties of the electrolyte contained in the separator 23. These dictate the capacity and operating voltage.

For redundancy purposes and in order to prevent failed capacitor cells 46 which are connected in parallel to other capacitor cells from adversely affecting those capacitor cells, diodes, circuit breakers and relays can be used to control and prevent short circuiting in one circuit from adversely effecting an adjacent parallel circuit.

The available energy is governed by the capacity and the voltage, according to the formula: $E=\frac{1}{2}CV^2$. The ability to efficiently use this stored energy while operating at high power is limited by internal impedance. Impedance is governed by the limit on rates of ion transport within the electrolyte and by the resistance from the external circuit connection to the surface of the highly porous electrodes.

Power lost due to resistance is proportional to $I^2R$ for the electrode. With this design, the thin-layer electrode applies less porous material, decreasing I proportionally, for a given amount of bulk current collector. Another way to represent this is that there is more "gross" electrode area for current collection in proportion to the total electrode area of the highly porous material. This dramatically improves the device efficiency. Weight is not an issue since the bulk current collector is also serving as structure.

This design also provides a greater "gross" electrolyte surface area in proportion to the total electrode area of the highly porous material. This mitigates impedance due to limitations on the ion transport within the electrolyte.

Alternative Structural Embodiments

Figure 9:
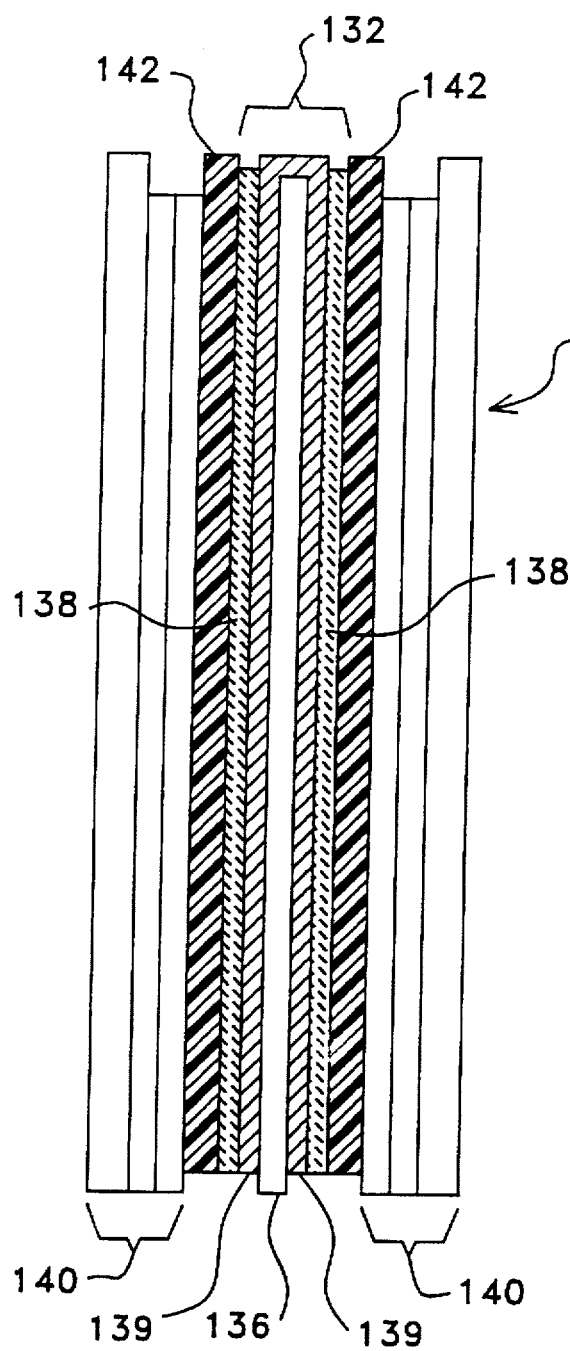
FIG. 9 is a cross-sectional view similar to the view of FIG. 2, showing a second embodiment of an electrode stack, the stack having a bipolar electrode arrangement.

An alternative structural embodiment of an electrode stack 13 0 for a capacitor cell is illustrated in FIG. 9. The electrode stack 130 is similar to the first embodiment described above in conjunction with FIG. 2. In this embodiment, however, an anode 132 is two-sided, having a current collection layer 134 on either side of a substrate layer 136 and an electrode layer 138 on the outer sides of the current collection layers 134. An identical cathode 140 and separator 142 to the ones 22 and 23 described above are bonded to each side of the anode 132. The electrode stack 130 thus formed is bipolar. This bipolar arrangement can be used with the above-described embodiment for a capacitor panel.

Figure 10:
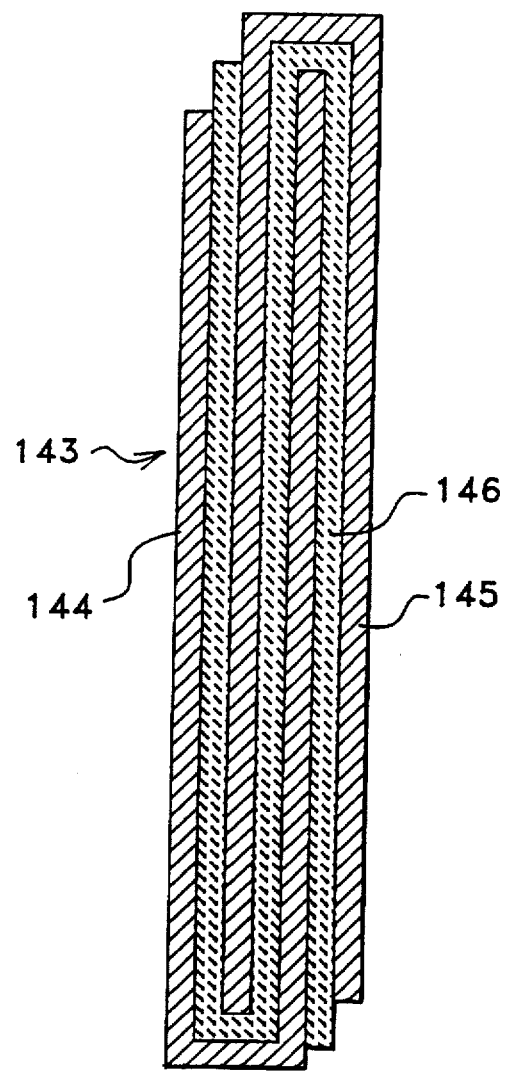
FIG. 10 is a cross-sectional view similar to the view of FIG. 2, showing a third embodiment of an electrode stack, the stack having a multi-layered configuration.

A third structural embodiment of an electrode stack 143 for a capacitor cell is illustrated in FIG. 10. The electrode stack is similar to the first and second embodiments described above in conjunction with FIGS. 2 and 9, respectively. In this embodiment, however, an anode 144 is u-shaped and has two elements and a cathode 145 is u-shaped and has two elements. The anode 144 and cathode 145 are positioned relative to each other in such a manner as to alternate the anode and cathode elements. An electrolyte-wetted separator 146 is positioned between the anode 144 and cathode 145 t o prevent conduction between the anode 144 an d cathode 145 and to increase the capacitance therebetween by acting as a dielectric. This arrangement can be used with the above-described embodiment for a capacitor panel. Only two layers of alternating anode and cathode elements are shown, but the principle of multiple layering could be carried to larger numbers of layers.

Figure 6:
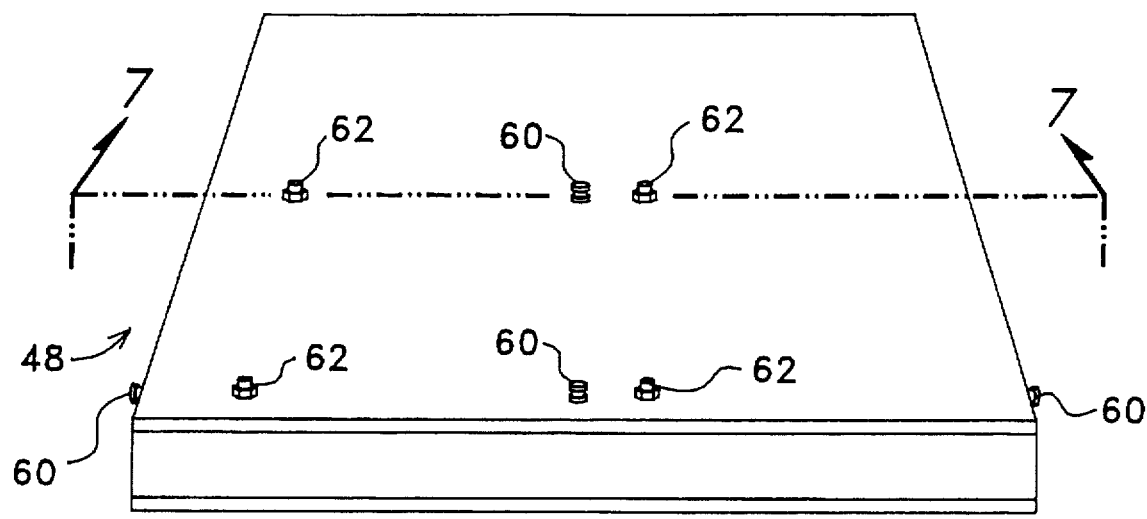
FIG. 6 is a perspective view of an assembled capacitor panel such as is shown in FIG. 5.
Figure 11:
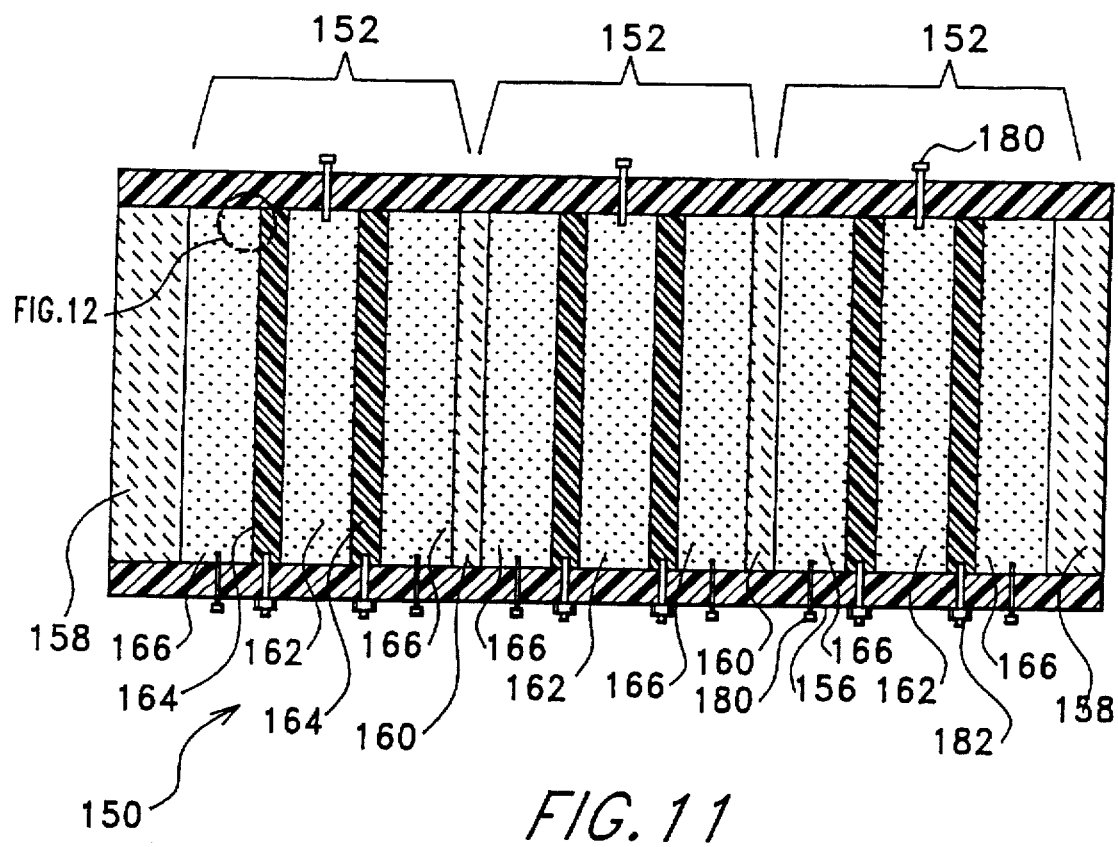
FIG. 11 is a cross-sectional view of an alternative embodiment of the capacitor panel of FIGS. 5 and 7.
Figure 12:
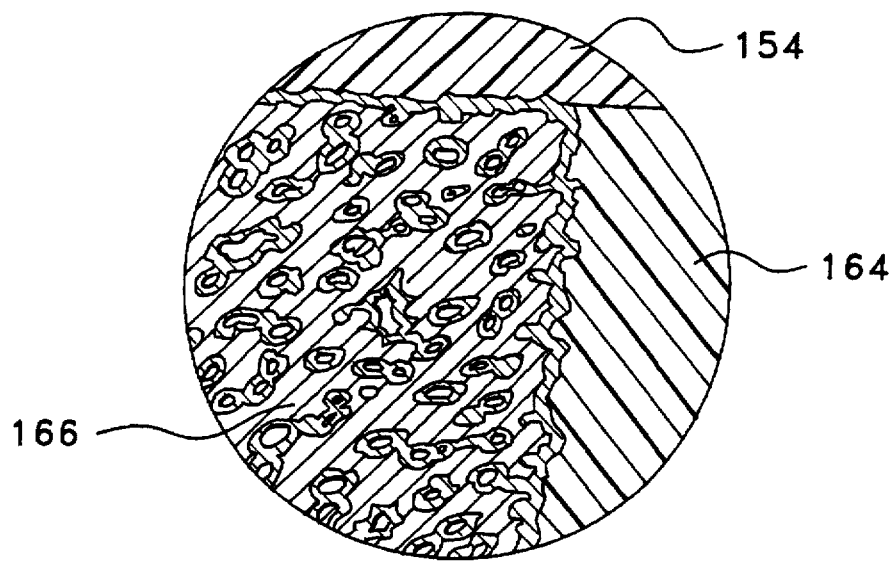
FIG. 12 is a close-up view of the encircled area of FIG. 11 showing the foam structure.

An alternative embodiment to the capacitor panel 48 of FIGS. 5, 6, and 7 is illustrated by a capacitor panel 150 in FIGS. 11 and 12. In this embodiment, there is no honeycomb structure of electrode stacks. Instead, the capacitor panel 150 of this embodiment includes a plurality of capacitor cells 152 composed of foam. FIG. I shows the capacitor panel 150 with three such cells 152 enclosed between an upper and lower faceplate 154 and 156, and a pair of edge closures 158. Each of the three cells 152 is isolated from each other by a cell boundary layer 160 which is electrically-insulating structural foam such as polystyrene. Within each cell 152 there is a bipolar arrangement with a centered anode 162, a separator 164 on either side thereof, and a cathode 166 on the opposite sides of each of the two separators 164. As seen in the close-up view of FIG. 13, the cathode 166 includes a nickel foam with a highly porous surface. In a similar fashion, the anode 162 includes a nickel foam with a highly-porous surface. The nickel foam in the anode 162 and the cathodes 166 act as the current collector layer did in the first embodiment. An electrical feed-through in the form of a pin 180 is provided from the anode 162 and the cathodes 166 through the upper and lower faceplates 154 and 156, respectively. Activation ports 182 are provided through the lower faceplate 156 to wet the separator 164 with an electrolyte solution (not shown). It can be seen that this structure provides a capacitor as with the first embodiment, and also provides a structure with a plurality of voids defined therein so as to reduce the mass and provide the capability to absorb mechanical energy from impact.

Foamed metals and plastics represent an alternative light weight panel construction which achieves the same advantageous effects as honeycomb. Large quantities of empty spaces in the foam allow for very light weight. If the foam is bonded between the faceplates, it is protected and loads are distributed into the foam. The nickel foam generally includes empty spaces or bubbles that are not necessarily interconnected (closed cell foam). The surface, by virtue of being cut, is a rough and highly porous surface for a short distance into the slab. The separator material is a rigid open cell foam which is electrically-insulating but capable of absorbing electrolytes and allowing ion transport between the two electrodes. A fourth foam material provides insulation between the adjacent electrodes. It is a rigid foam plastic of closed cell construction to prevent leakage of electrolyte between adjacent cells. This is the cell boundary layer 160 between the adjacent cells 152. The electrolyte is limited to the separator 164 and the surfaces of the electrodes 162 and 166. Most of the empty spaces in the foamed material of which the electrodes 162 and 166 are composed remain void except for residual gases. The bulk of the foam material of which the electrodes 162 and 166 are composed serves as a very low impedance current collector. In this embodiment the elements of the capacitor are configured so as to create a light weight structural material. In this manner, the mass and volume of the capacitor may be distributed about the vehicle or device requiring electric power and may perform a useful function relative to the vehicle or device.

From the example of alternative electrode stack sequencing, it should be apparent to anyone practiced in the art that this invention can adopt almost any electrode stack sequence. The electrodes and separators still may be configured in an elongated manner and formed into a honeycomb core material in which they serve as structural elements as well as capacitor components to thereby allow distribution of the mass and volume of the capacitor throughout the vehicle or device which requires electric power and in which the elements of the capacitor perform another useful function for the vehicle or device in addition to energy storage.

It should be apparent to anyone practiced in the art that a wide variety of electrodes and separator configurations, beyond the specific embodiments of honeycomb and foam configurations may be devised in which elements of the capacitor (electrodes, separators, current collectors, or insulating boundaries) serve as light weight structural members to thereby allow distribution of the mass and volume of the capacitor throughout the vehicle or device requiring electrical power and in which the elements of the capacitor perform another useful function for the vehicle or device in addition to energy storage.

EXAMPLE

A 2-foot by 2-foot by 1.75-inch capacitor panel may contain 2.5 kg of face sheets, inserts and adhesive, 3.92 kg of current collector, and 2.28 kg of active material (porous electrode material, electrolyte, and separator), for a total of 6.2 kg. For energy storage at 10 W-hr/kg (for the weight of the active material only), this would provide a storage capability of 22.8 W-hr for the panel. The panel of the present invention has a performance value as a stand-alone ultracapacitor of 3.68 W-hr/kg (for the weight of the entire capacitor panel). This device will improve the overall performance of a vehicle, however, when it also serves as structure for the vehicle, as will be shown in the following example.

Panels such as these can be used to replace the conventional stand-alone structure and ultracapacitor in a hybrid electric vehicle. Consider a hybrid electric vehicle having 300 kg of structure and 50 kg of ultracapacitors. The active material within the ultracapacitor is also capable of 10 W-hr/kg. After considering packaging and current collection, the stand-alone ultracapacitor assembly's performance is estimated at 6 W-hr/kg, and thus the vehicle stores 300 W-hr of energy.

To achieve 300 W-hr of energy storage using the honeycomb ultracapacitor panel of the present invention, just over 15 panels as described above would be required (300 W-hr/22.8 W-hr/panel=13.16 panels).

Neglecting the benefit of distributed weight and assuming our inactive materials serve to replace structure, then the weight of the structure other than that provided by the ultracapacitor panels is:300 kg−13.16 panels * (2.5+3.92) kg/panel=215.5 kg.

This means the weight of the structural portions of the honeycomb ultracapacitor panels is:300 kg−215.5 kg=84.5 kg. Also, the weight of the active, energy-storing materials within the honeycomb panels is 30 kg. Therefore, the overall weight of the vehicle is: 215.5 kg+84.5 kg+30 kg=330 kg. Thus the total vehicle weight has been reduced from 350 kg to 330 kg, a 5.7% (by weight) reduction. Alternatively, if the overall weight were held at 350 kg, then 22 panels could be used, providing 501 W-hr. This would amount to an on-board energy storage improvement of 67% at no added weight.

ADVANTAGES

The distributed capacitor system of the present invention is applicable not only to electric and hybrid-electric vehicles, but to other applications requiring surges of relatively high electrical power. With each of these applications, the improved capacitor design can be used to provide structure for the device, possibly by forming the shell or container for the device. Allowing a functional component to serve as structure provides a great savings in mass. This capacitor system, unlike other capacitor systems, is integral with the structure of the device or vehicle, sharing the support and using the free surface area and volume to store large amounts of energy with minimum weight. Thus, the improved ultracapacitor design of the present invention makes electric and hybrid-electric vehicles more feasible and allows for the replacement of motor vehicles powered by fossil fuels. In addition, the porous electrode material allows for increased effective surface area and thus increased capacitance while the current collector layer to which the porous electrode material is attached mitigates against the increased internal resistance normally experienced with porous electrode materials. This current collector layer can be provided to the vehicle without a significant increase in vehicle weight, since the current collector layer also serves as structure for the vehicle. The advantage may be extended to assist in overcoming problems with electrolyte that allows a higher operating voltage, but has poorer ionic conductivity. If the weight of the underlying current collector is discounted (as is appropriate because it serves as structure), then larger surface areas with thinner films of materials can be used, thereby decreasing the problem of poorer ionic conduction. Lastly, the inherent light-weight, yet structurally strong and stiff properties of a honeycomb of foam-core structure are a significant advantage of the capacitor system of the present invention, because it allows the capacitor itself to be used as a structural component of the vehicle or device.

The foregoing description is considered as illustrative only of the principles of the invention. Furthermore, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

The invention claimed is:

1. A capacitor for storing electrical energy, comprising:
   an elongated anode, including an electrode layer;
   an elongated cathode positioned adjacent and in spaced-apart relation to the anode, the cathode including an electrode layer; and
   a separator positioned between the anode and the cathode which serves as a dielectric by providing electrical insulation between the anode and the cathode yet permitting an electrostatic field to be developed between the anode and the cathode to increase the energy storable in the capacitor;

wherein the anode, the separator, and the cathode form an elongated capacitor stack; and wherein a plurality of elongated capacitor stacks are connected together in a honeycomb structure, each of the plurality of elongated capacitor stacks being a layer of the honeycomb structure.

2. A capacitor as defined in claim 1, wherein the separator is permeable and is wetted with an electrolyte solution which enhances the dielectric properties of the separator.

3. A capacitor as defined in claim 2, wherein the electrolyte solution includes potassium-hydroxide.

4. A capacitor as defined in claim 2, wherein the electrolyte solution includes an organic solvent with dissolved ions.

5. A capacitor as defined in claim 1, wherein the anode includes a support layer and wherein the cathode includes a support layer.

6. A capacitor as defined in claim 1, wherein the anode includes a current collector layer and wherein the cathode includes a current collector layer.

7. A capacitor as defined in claim 1 wherein the anode includes a support layer and a current collector layer, and wherein the cathode includes a support layer and a current collector layer.

8. A capacitor as defined in claim 7, wherein on the anode a thin film of polypropylene serves as the support layer and a thin film of nickel is sputtered onto the polypropylene to form the current collector layer.

9. A capacitor as defined in claim 7, wherein on the cathode a thin film of polypropylene serves as the support layer and a thin film of nickel is sputtered onto the polypropylene to form the current collector layer.

10. A capacitor as defined in claim 7, wherein the separator is a polypropylene cloth onto which nickel is sputtered in a thin film and then particulate nickel is deposited thereon.

11. A capacitor as defined in claim 1, wherein the anode and cathode are bonded to the separator.

12. A capacitor as defined in claim 1, wherein the separator includes a polymeric material which separates and bonds the anode and cathode.

13. A capacitor as defined in claim 1, wherein the honeycomb structure is formed by a plurality of bonds, at least one of the bonds formed at each of a series of regular, spaced-apart positions between each pair of adjacent ones of said capacitor stacks.

14. A capacitor as defined in claim 13, wherein the positions of the bonds between any pair of adjacent ones of said capacitor stacks is offset from positions of bonds between one of the pair of adjacent ones of said capacitor stacks and another of said capacitor stacks bonded to one of said capacitor stacks in said one-of said pair of adjacent ones of said capacitor stacks.

15. A capacitor as defined in claim 1, wherein a plurality of separate honeycomb structures are each combined as separate cells into a capacitor panel including:

an insert frame which receives each of the plurality of separate cells; and a pair of faceplates, an upper faceplate and a lower faceplate, which are attached to the insert frame from opposite sides to sandwich the cells therein.

16. A capacitor as defined in claim 15, wherein the faceplates are bonded to the insert frame and to the separate cells, the bonding of the faceplates to the insert frame and to the separate cells being made by electrically-insulating adhesive.

17. A capacitor as defined in claim 16, wherein the separator is permeable and is wetted with a potassium-hydroxide electrolyte solution which increases the capacitance between the anode and the cathode;

wherein the anode and the cathode each include a support layer and a current collector layer;

wherein the anode and cathode are adhered to the separator; and wherein the honeycomb structure is formed by a plurality of bonds, at least one of the bonds formed at each of a series of regular, spaced-apart positions between each pair of adjacent ones of said capacitor stacks and wherein the positions of the bonds between any pair of adjacent ones of said capacitor stacks is offset from positions of bonds between one of the pair of adjacent ones of said capacitor stacks and another of said capacitor stacks bonded to one of said capacitor stacks in said one of said lair of adjacent ones of said capacitor stacks.

18. A capacitor as defined in claim 15, further including a plurality of edge closures peripherally outside of the insert frame and the separate cells and also sandwiched between the faceplates.

19. A capacitor as defined in claim 1, wherein the direction of energy flow to the capacitor is reversible so that the energy can be stored in the capacitor by charging the capacitor and the energy can be extracted from the capacitor by discharging the capacitor.

20. A capacitor as defined in claim 1, further including a second separator and second cathode positioned adjacent to the anode and on an opposite side of the anode from the first separator and first cathode.

21. A method for assembling a capacitor, comprising the steps of:

providing an elongated anode including an electrode;

providing an elongated cathode including an electrode;

providing an elongated, porous separator;

bonding the anode and cathode to opposite sides of the separator to form an elongated capacitor stack;

assembling a plurality of elongated capacitor stacks into a honeycomb structure, each of the plurality of elongated capacitor stacks being a layer of the honeycomb structure; and wetting the separator with an electrolyte.

22. A method as defined in claim 21, wherein the honeycomb structure defines a capacitor cell, the method further including the steps of:

isolating a plurality of capacitor cells from each other;

encasing the plurality of isolated capacitor cells within a shell to form a capacitor panel; and providing electrical feed-throughs from the capacitor cells to the exterior of the shell.

23. A method as defined in claim 21, wherein the electrodes of the anode and cathode include metal as does the separator, and wherein the bonding step includes electrodepositing additional metal to the electrodes and the separator while the electrodes and separator are held in close proximity to each other to bond the anode, separator, and cathode to each other.

24. A capacitor for storing electrical energy, comprising:

an anode including an electrode, the electrode having a multitude of voids defined therein;

a cathode positioned adjacent and in spaced-apart relation to the anode, the cathode having a multitude of voids defined therein, the cathode including an electrode; and a separator positioned between the anode and the cathode which selves as a dielectric by providing electrical insulation between the anode and the cathode yet permitting an electrostatic field to be developed between the anode and the cathode, to increase the energy storable in the capacitor, the separator having a multitude of voids defined therein;

wherein the anode, the separator, and the cathode are sandwiched between a first face plate and a second face plate to form a structure which has a multitude of voids defined therein to provide a sturdy yet light-weight structural capacitor panel and said separator extends from said first face plate to said second face plate.

25. A capacitor as defined in claim 24, wherein the anode and the cathode are composed of a foam material.

26. A capacitor as defined in claim 24, wherein the anode, the cathode, and the separator are oriented transversely to said first and second face plates.

27. A capacitor formed as a structural panel assembly, comprising:

a plurality of thin capacitive elements arranged and bonded together in a honeycomb configuration, wherein layers of the honeycomb configuration include the thin capacitive elements.

* * * * *